US009814255B2

(12) United States Patent
Wong et al.

(10) Patent No.: US 9,814,255 B2
(45) Date of Patent: Nov. 14, 2017

(54) METHOD FOR PRODUCING PURPLE SWEET POTATO JUICE AND DRIED POWDER

(75) Inventors: Wang-Chan Wong, Irvin, CA (US); Jerry Wu, San Jose, CA (US); James-Jianguo Chen, San Jose, CA (US); Brien Quirk, San Jose, CA (US)

(73) Assignee: Darco Natural Products Inc., San Jose, CA (US)

( * ) Notice: Subject to any disclaimer, the term of this patent is extended or adjusted under 35 U.S.C. 154(b) by 586 days.

(21) Appl. No.: 13/475,984

(22) Filed: May 20, 2012

(65) Prior Publication Data

US 2013/0309355 A1 Nov. 21, 2013

(51) Int. Cl.
| A23L 2/04 | (2006.01) |
|---|---|
| A23L 19/10 | (2016.01) |
| A23L 2/08 | (2006.01) |
| A23L 2/52 | (2006.01) |
| A23L 19/15 | (2016.01) |
| A23L 33/105 | (2016.01) |

(52) U.S. Cl.
CPC ........ *A23L 2/04* (2013.01); *A23L 2/08* (2013.01); *A23L 2/52* (2013.01); *A23L 19/105* (2016.08); *A23L 19/15* (2016.08); *A23L 33/105* (2016.08)

(58) Field of Classification Search
CPC .................................................. A23V 2200/04
USPC ........................................................... 426/52
See application file for complete search history.

(56) References Cited

U.S. PATENT DOCUMENTS

| 3,385,711 A | 5/1968 | Sperti ........................... 426/431 |
| 3,754,932 A | 8/1973 | Baker et al. |
| 3,988,204 A | 10/1976 | Andreasen et al. ............ 426/13 |
| 4,371,552 A | 2/1983 | Posorske ......................... 426/50 |
| 4,569,853 A | 2/1986 | Strobel .......................... 426/599 |
| 5,298,275 A | 3/1994 | Balasingham et al. ....... 426/599 |
| 5,500,241 A | 3/1996 | Balasingham et al. ....... 426/599 |

(Continued)

FOREIGN PATENT DOCUMENTS

CN 1460694 * 12/2003 ............. C09B 61/00

OTHER PUBLICATIONS

Steed et al., Anthocyanin Content, Antioxidant Activity, and Selected Physical Properties of Flowable Purple-Fleshed Sweetpotato Purees, Journal of Food Science, vol. 73, No. 5, 2008.*

*Primary Examiner* — D Lawrence Tarazano
*Assistant Examiner* — Philip Dubois
(74) *Attorney, Agent, or Firm* — Imperium Patent Works; Zheng Jin; Helen Mao (57) ABSTRACT

A method for preparing a purple sweet potato concentrate that is free from starch, rich in anthocyanins, phenolic compounds, minerals, and soluble dietary fiber with low viscosity, attractive color, and with natural sweetness is presented. The method first prepares and liquefies the purple sweet potatoes and fixes the colorization by adjusting the pH value. Next, amylase and an enzyme complex of hemicellulase, pectinase, cellulase, glucoamylase and protease are added in sequence under conditions effective to produce the juice with the above mentioned properties. The juice is then centrifuged and membrane-filtered to produce a purified purple sweet potato juice which is vacuum-concentrated to yield a purple sweet potato concentrate. Purple sweet potato powder can be obtained by vacuum drying the sediment and concentrate mixture.

7 Claims, 6 Drawing Sheets

THE OVERALL HIGH LEVEL DEPICTION (56) References Cited

U.S. PATENT DOCUMENTS

| | | | |
|---|---|---|---|
| 5,525,154 A * | 6/1996 | Hagenimana et al. | 127/66 |
| 5,902,616 A | 5/1999 | Hinnergardt et al. | |
| 5,935,826 A | 8/1999 | Keller | 435/96 |
| 6,410,064 B1 | 6/2002 | Akazawa | 426/46 |
| 6,432,192 B1 * | 8/2002 | Cook et al. | 106/496 |
| 6,723,355 B2 | 4/2004 | Gnnewig et al. | 426/51 |
| 7,056,544 B2 | 6/2006 | Xu et al. | 426/52 |
| 7,833,560 B2 | 11/2010 | Velissariou et al. | 426/590 |
| 2003/0134006 A1 * | 7/2003 | Chukwu | 426/44 |
| 2009/0035441 A1 | 2/2009 | Hirashima et al. | 426/599 |
| 2009/0246343 A1 | 10/2009 | Wu et al. | 426/540 |
| 2010/0291244 A1 | 11/2010 | Sim et al. | 426/728 |

* cited by examiner

FIG. 1 THE OVERALL HIGH LEVEL DEPICTION

FIG. 2 THE PREPROCESSING PHASE

FIG. 3 THE LIQUEFYING PHASE

FIG 4. THE ENZYME TREATMENT PHASE

FIG 5. THE FILTRATION PHASE

FIG 6. THE HARVESTING PHASE

METHOD FOR PRODUCING PURPLE SWEET POTATO JUICE AND DRIED POWDER

TECHNICAL FIELD

The present invention relates generally to food processing technology, more particularly, to method and process of producing purple sweet potato juice and dried powder using an enzyme complex of amylase, hemicellulase, pectinase, cellulase, glucoamylase, and protease.

BACKGROUND

Purple sweet potato has recently received attention as a healthful food. Purple sweet potato (PSP) is rich in anthocyanins and phenolic compounds. Anthocyanins are the deeply pigmented red, purple and blue flavonoid compounds that have significant physiological effects and bioactivity in humans. Anthocyanins are well known from medical research for their capillary health stabilizing effects, increasing the strength of the capillary wall to help reduce bleeding. They are part of the vitamin P complex of bioflavonoids which is related to rutin and citrus bioflavonoids.

One of the earliest studied sources of anthocyanins has been from Bilberry (*Vaccinium myrtillus*) or European Blueberry which is a smaller, wild type of low bush blueberry that has a long history of use in European countries for improving eye health and night vision. Some earlier studies using much higher dosages of anthocyanins showed promising effects for myopia and night vision. More recent studies with anthocyanins in the oligomeric form derived from grapes have shown a beneficial effect for myopia and night vision at lower to moderate dosages (Lee J, 2005), and for video terminal eye fatigue (Nakaishi H, 2000).

Purple sweet potato and its anthocyanins have shown similar brain and cognitive effects as blueberries in both in vitro and in vivo studies (Wu D M, 2008; Ye J, 2009; Shan Q, 2009; Wang Y J 2009; Park 2010). The extract inhibited lipid peroxidation from ferrous ion and ascorbic acid in rat brain homogenates (Cho, 2003) and strongly improved cognitive performance, assessed by passive avoidance test in ethanol treated mice.

Purple sweet potato has been shown to repair d-galactose-induced spatial learning and memory impairment by regulating the expression of synaptic proteins. The effect of purple sweet potato on the spatial learning and memory has been demonstrated by studies in vivo in a water maze with mice treated with d-galactose. Memory formation depends on pre- and post-synaptic proteins, but low levels can be improved by treatment with purple sweet potato extract (Wu D M, 2008).

Anthocyanins from purple sweet potato suppress the development of atherosclerotic lesions. Vascular damage and insufficiency is also implicated in cerebrovascular insufficiency, stroke and aging brain pathologies. Studies have shown there are protective effects of anthocyanins from purple sweet potato against low-density lipoprotein (LDL) oxidation and atherosclerotic lesion development in mice (Kano M, 2005; Miyazaki K, 2008). It protected LDL against oxidation more effectively than other anthocyanins and l-ascorbic acid in vitro. Atherosclerotic plaque area was reduced to about half of controls, oxidative stress markers, and soluble vascular cell adhesion molecule-1 were also reduced (Miyazaki K, 2008).

Amyloid-beta peptide is implicated in Alzheimer's disease pathology and is known to induce redox imbalance, mitochondrial dysfunction and caspase activation, resulting in neuronal cell death. An in vitro study of purple sweet potato anthocyanins decreased the toxicity of amyloid peptide free radicals, lipid peroxidation, and cell death which may help prevent loss of cognitive function, help sustain energy production in mitochondria, and reduce risk of dementia (Ye, 2010). Purple sweet potato color ameliorates cognition deficits and attenuates oxidative damage and inflammation in aging and the anthocyanins improved learning and memory ability, suppressed cyclooxygenase-2 (COX-2) and inducible nitric oxide synthases (iNOS) expression in mouse brain, decreased excess overproduction of tumor necrosis factor-alpha (TNF-alpha), interleukin-1beta (IL-1beta) and interleukin-6 (IL-6) in the mouse brain. By decreasing pro-inflammatory pathways purple sweet potato color suppresses lipopolysaccharide-induced acute inflammatory responses in the brain (Wang Y J, 2009).

Another area of health benefits of purple sweet potato is its ability to reduce damage to blood vessels by excess sugar in the blood which causes protein glycation, also a known factor in beta amyloid synthesis (Park, 2010). Blood pressure reducing effects can also decrease damage to the brain. It has been shown that purple sweet potato has anti-hypertensive effects (Shindo, 2007).

Purple sweet potato has long been staple food in China, Japan, and Korea because of its taste and its health benefits. Purple sweet potato can be prepared in many creative ways for both sweet and savory taste. For example, purple sweet potato can be steamed, boiled, baked, stewed, and made into dumplings. In the West, purple sweet potato finds its niche. Many lifestyle and health care experts such as livestrong.com and Dr. Oz, highly recommend consuming purple sweet potato. Markets for purple sweet potato chips and purple sweet potato pies are emerging.

In order to reap its maximum health benefit, one has to consume a large quantity of purple sweet potato on a regular base. Unfortunately, purple sweet potato is still considered to be a novelty item. It is not always available in the general markets. Very often one has to search for them in Asian groceries. Furthermore, purple sweet potato is a flatulence-producing food because it is high in certain polysaccharides, especially oligosaccharides such as inulin. For people who are prone to bloating and suffer from flatulence, purple sweet potato may make the problem worse. The purple sweet potato liquid extract produced with this invention contains as much as 500 mg of anthocyanins and as much as 6,155 mg total phenolic compounds per 100 gm of the liquid, which is equivalent to consuming a 100 gm of baked purple sweet potato[1] without the starch.

Purple sweet potato is heavily used in the industry to provide natural pigments alternative to synthetic colorants. The process to extract PSP powders is designed primarily to obtain high purity and high color anthocyanin pigments. However, the process is complex and costly. A large amount of anthocyanins, phenolic compounds and other active ingredients are also lost in the process. The process also creates environmental pollution because it uses citric acid or hydrochloric acid solution and acidified ethanol solution as the extraction solvent to extract the anthocyanin pigments. In summary, existing process suffers from the low extraction rate of anthocyanins, high production cost, loss of nutritional content and creating waste and pollutant.

The purpose of the present invention is to overcome the deficiencies of the existing manufacturing process and to produce a natural purple sweet potato juice that is free from starch, rich in anthocyanins, phenolic compounds, and soluble dietary fiber with low viscosity, attractive color, and with natural sweetness.

SUMMARY

The present invention comprises in a process for producing purple sweet potato juice and dried powder rich in content of anthocyanins, active phenolic compounds, soluble dietary fiber, and other nutrients, with natural flavors, natural sweetener, active low viscosity without pollutants to the environment and suitable for human consumption. This is accomplished by, (a) soaking, washing, sterilizing fresh or dried purple sweet potatoes at the same time de-activating the enzymes in them, (b) grinding the potatoes and fixing the color desirable for drinks and beverages by adjusting the pH value between 2.5 to 5.5, (c) for fresh raw purple sweet potatoes, liquefying the puree by adding 0.5 to 3 times of treated water to its weight; for dried purple sweet potatoes, liquefying the puree by adding 2 to 8 times of treated water to its weight, (d) warming up the liquid to 90.degree. C. to 110.degree. C. for 1 to 6 minutes, (e) adjusting the pH value to 4.0 to 7.0 before treating the liquid with amylase, maintaining the temperature at 40.degree. C. to 65.degree. C. for 1 to 3 hours, (f) adjusting its pH value between 3.0 to 5.0, then adding the enzyme complex of pectinase, cellulase, hemicellulase, glucoamylase, and protease, maintaining the temperature at 40.degree. C. to 65.degree. C. for 1 to 5 hours, (h) separate the part of the enzyme treated PSP mixture from the solids through a centrifuge, followed by filtering the liquid with a membrane filter and a nano filter or via reverse osmosis membrane to obtain the purified PSP juice, (i) vacuum-concentrating the purified PSP juice to obtain PSP concentrate, (j) vacuum and dry the sediment to obtain PSP dried powder.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

Figure 1:
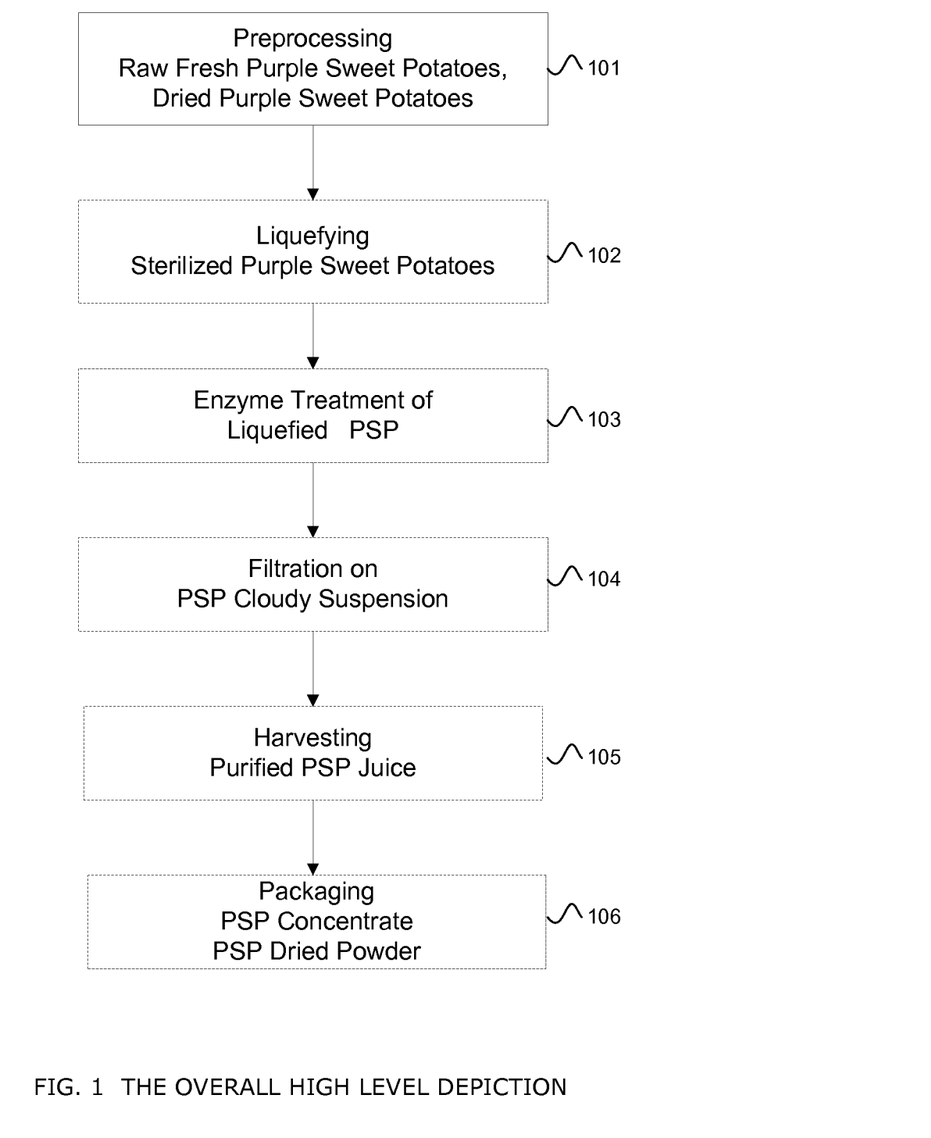
FIG. 1 is the high level flow chart for illustrating the process of this invention. It is comprised of 5 stages, namely, preprocessing, liquefying, enzyme treatment, filtration and harvesting. Then the products are packaged for shipping.

FIG. 1 is a detailed description of a manufacturing process of purple sweet potato juice and dried powder by using an enzyme complex of amylase, hemicellulase, pectinase, cellulase, glucoamylase, and protease according to the present invention. The process is partitioned into five phases, namely, preprocessing, liquefying, enzyme treatment, filtration and harvesting as depicted in FIG. 1. During the preprocessing phase at block 101, raw fresh potatoes or dried purple sweet potatoes are sterilized. The sterilized purple sweet potatoes then are liquefied at liquefying phases at block 102. At block 103, enzyme treatment on liquefied PSP produces PSP suspension which goes through the separation and filtration phase at block 104 to produce purified PSP juice. In harvesting phase at block 105, purified PSP juice is concentrated to produce PSP concentrates for packaging, and at block 106, PSP dried powder is collected and packaged. The details of each phase are illustrated in the following figures.

Figure 2:
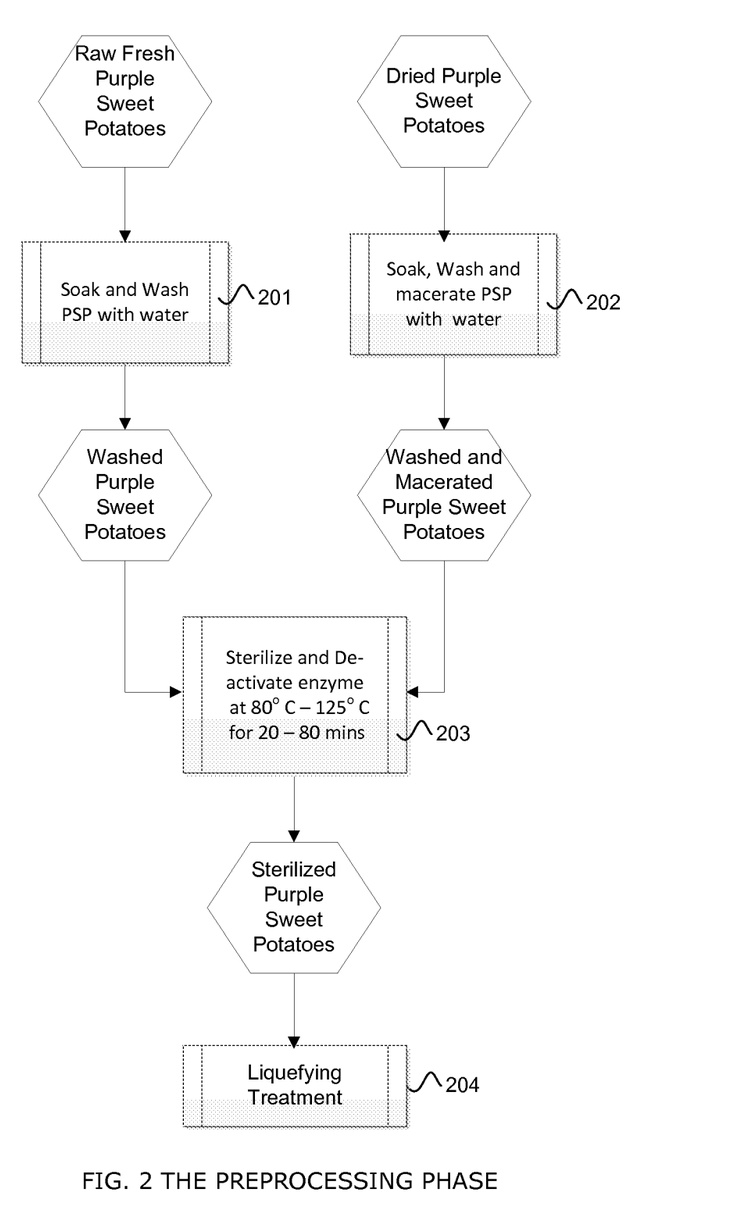
FIG. 2 depicts the details of the pre-processing process to soak, wash and sterilize fresh or dried purple sweet potatoes so that they are ready for liquefaction.

FIG. 2 shows the details of the preprocessing phase. Fresh purple sweet potato is soaked and washed with water at step 201. The process can also accommodate dried purple sweet potatoes. In such case, the dried purple sweet potatoes will be soaked, washed and macerated with filtered water at step 202. In either case, the cleaned and macerated purple sweet potatoes will be sterilized by steaming at 80° C. to 125° C. for 20 to 80 minutes at step 203. The steaming also serves as a process to de-activate the enzymes in the potatoes. At the end of the preprocessing process, a batch of sterilized purple sweet potatoes is obtained and is ready to be liquefied in liquefying treatment phase at step 204 which is described in FIG. 3.

Figure 3:
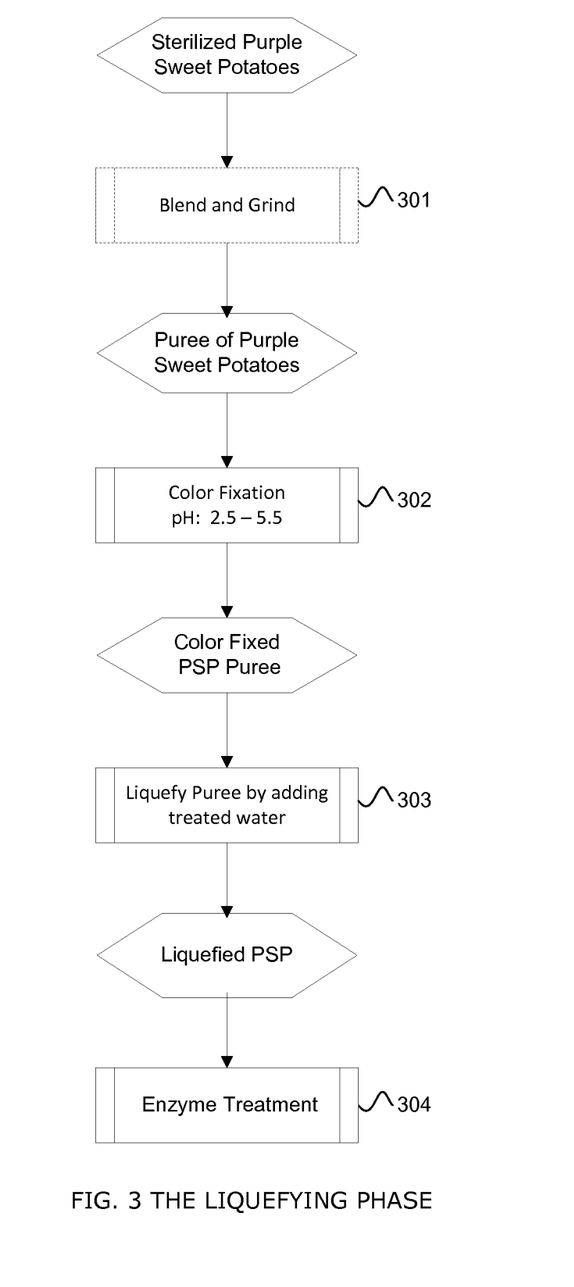
FIG. 3 illustrates the liquefying process, in which, color fixation is completed before liquefaction.

FIG. 3 illustrates the liquefying process. The batch of sterilized purple sweet potatoes is then ground and blended to obtain a consistent puree at step 301. Step 302 involves color fixation by adjusting the pH to 2.5-5.5 by using citric acid. Color fixed PSP puree is then liquefied at step 303 by adding treated water. For fresh raw purple sweet potato, treated water of 0.5 to 3 times its weight is added. For dried purple sweet potatoes, it is necessary to add 2 to 8 times its weight of treated water. The liquefied purple sweet potatoes are ready for the enzyme treatment phase at step 304 which is described in FIG. 4.

Figure 4:
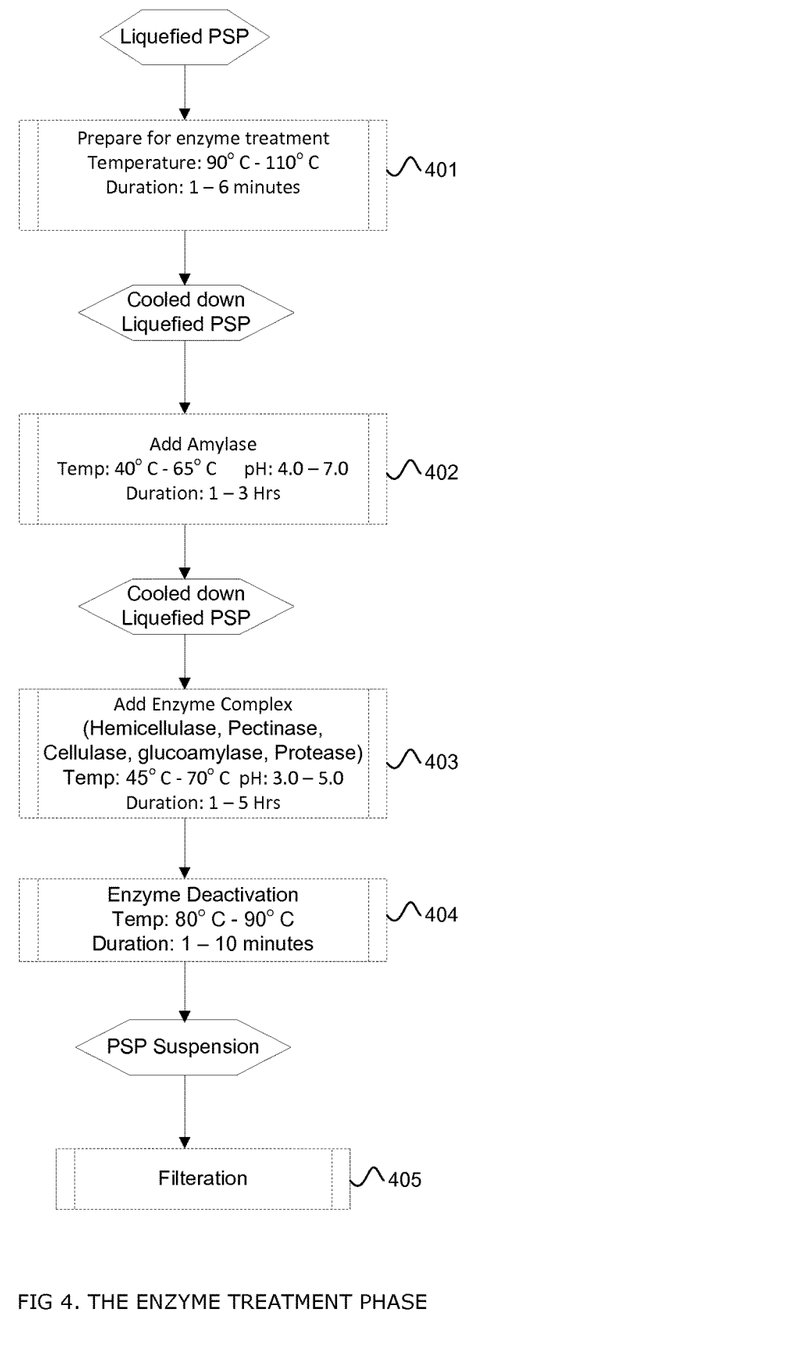
FIG. 4 shows a three-step enzyme treatment process. After preparation, the liquefied PSP is treated with amylase, followed by an enzyme complex of hemicellulase, pectinase, cellulase, glucoamylase, and protease.

FIG. 4 depicts the Enzyme Treatment process. The liquefied purple sweet potato is warmed up to 90° C. to 110° C. for 1 to 6 minutes at step 401. After the liquefied PSP cools down, its pH is adjusted to 4.0 to 7.0 by using citric acid before adding 5 to 15 SKBU/g amylase solution to the slurry at step 402. The temperature is maintained at 40° C. to 65° C. for 1 to 3 hours. Amylase is an enzyme that catalyzes the breakdown of starch into maltodextrins and glucoamylase converts maltodextrins to maltose and glucose.

At step 403, pH value of cooled down liquefied PSP is adjusted between 3.0 to 5.0, and then 5 to 36 U/g of an enzyme complex (hemicellulase 0 to 15%, pectinase 0 to 20%, cellulase 0 to 15%, glucoamylase 35% to 95%, and protease 0 to 15%) is added to the liquefied PSP while maintaining the temperature between 40.degree. C. to 70.degree. C. for 1 to 5 hours. Hemicellulase breaks cross-linking polymeric hemicellulose so the cell wall becomes more susceptible to other enzymatic defragmentation. Pectinase breaks down pectin, a polysaccharide substrate that is found in the cell walls of the purple sweet potatoes converting it to glucose. Pectinase also attacks dissolved pectin. Consequently, its viscosity is reduced because of the degradation of soluble high molecular weight materials in the juice. Rupture of cell wall membranes is a major key to increase the juice yield. It should be noted that pectin is not the only ingredient of cell wall. Cellulase is used here to attack the cellulose content of the cell wall, which helps improve further the yield of the juice by breaking open the cells to release more active pigments contain in cell vacuoles. Glucoamylase breaks the bonds near the ends of large carbohydrates such as the remaining starches, releasing maltose and free glucose. Finally, protease hydrolyses proteins in the slurry to amino acids that further lowers the viscosity of the juice. The combined enzymatic treatment converts the slurry mixture to a lower viscosity purple sweet potato juice by removing the starch and pectins for a better yield of the juice. At step 404, The PSP suspension is then heated to 80.degree. C. to 90.degree. C. for 1 minute to 10 minutes for enzyme deactivation. The resulting purple sweet potato suspension is ready to be separated at step 405 which is further described in FIG. 5.

Figure 5:
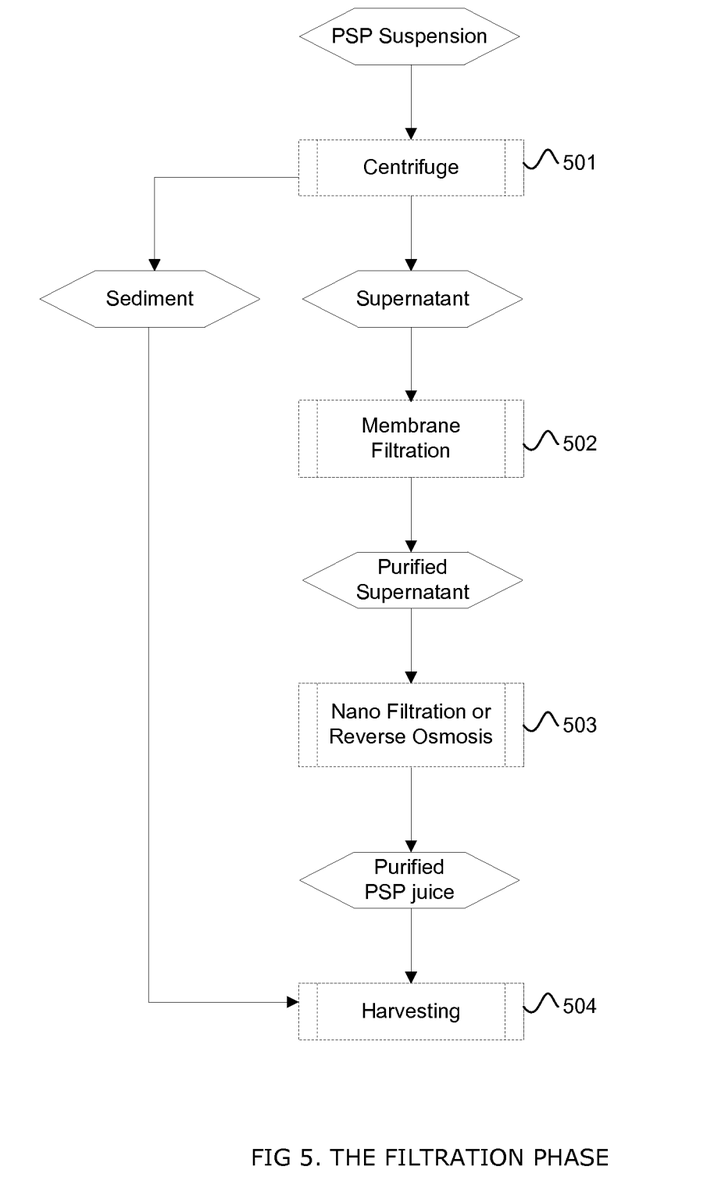
FIG. 5 shows the process of centrifuge separation and filtration of the PSP supernatant with membrane and nano filters or through reverse osmosis to obtain the purified PSP juice.

FIG. 5 describes the separation and purification processes. The PSP cloudy suspension obtained from the enzyme treatment phase is press-filtered or centrifuged to separate the supernatant from the sediment at step 501. The sediment will be harvested to produce tried PSP powder at step 504. The supernatant is further purified by membrane filtration at step 502. The liquid thus obtained has a Brix value of 6° to 12°. After nano-filtration and/or reverse osmosis at step 503, a purified purple sweet potato juice is obtained, which is now ready for harvesting at step 504.

Figure 6:
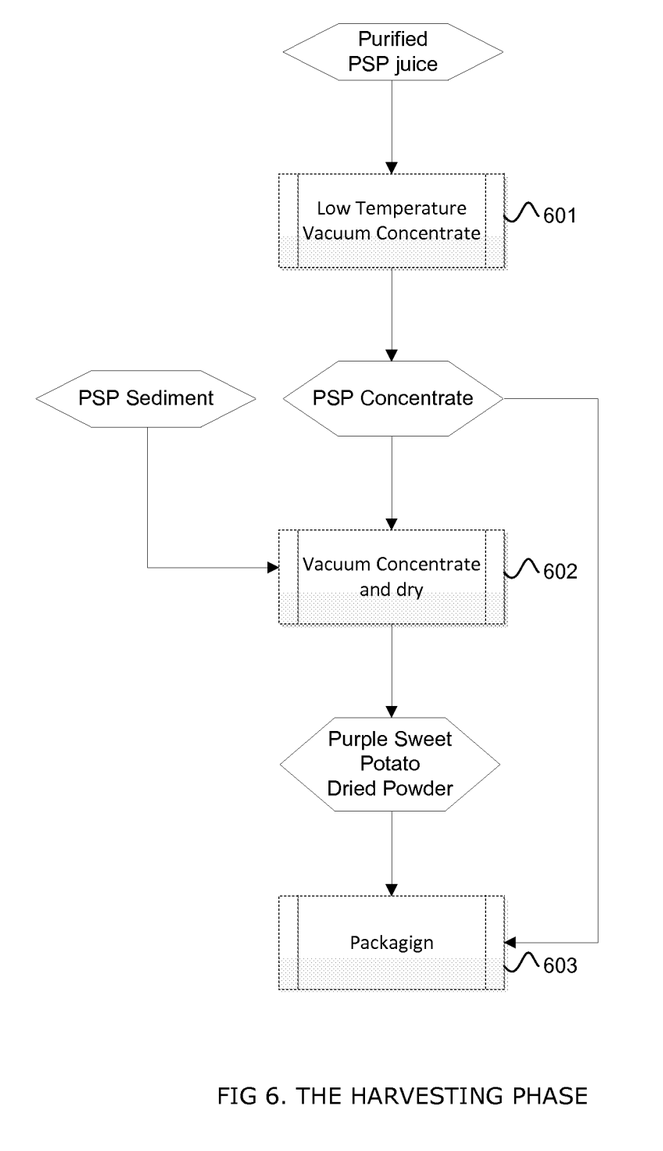
FIG. 6 depicts the steps to harvest PSP concentrate and PSP Dried Powder.

FIG. 6 shows the harvesting process. The purified purple sweet potato juice is subject to a controlled temperature vacuum concentration process at 25° C. to 85° C., at step 601 and a final purple sweet potato concentrate with Brix 55° is obtained. The purple sweet potato concentrate has more than 0.5% anthocyanins (w/w) and 1 to 2% phenolic compounds (w/w) and ready to be packaged at step 603. Also, the sediment can be combined with concentrated juice to be vacuum concentrated and dried to yield the purple sweet potato powder at step 602 for packaging at step 603.

EXAMPLES

The following examples are provided to illustrate embodiments of the present invention but are by no means intended to limit its scope.

One example of producing PSP juice and powers using the process in the present invention is described. 18 Kg raw fresh purple sweet potatoes are soaked, washed and sterilized and at the same time de-activating the existing enzymes. Then they are ground and blended while its color is fixed by adjusting its pH value to 5.5. Next, 45 Kg water is added and the puree is liquefied. The liquid purple sweet potato juice is then warmed up to 90.degree. C. to 110.degree. C. for 6 minutes. Adjust its pH value to 5.5, add 10 SKBU/g of amylase solution, and maintain the temperature at 50.degree. C. to 55.degree. C. Let the solution rest for 2 hours. Then adjust the pH value to 4.0 to 4.5 and then add 26 U/g the enzyme complex of hemicellulase, pectinase, cellulase, glugoamylase, and protease. Maintain the temperature between 45.degree. C. to 60.degree. C. Let it rest for 3 hours. The solution is then filtered by pressure filtration and centrifugation to remove the residues. The solution is further filtered with a microporous membrane with inlet pressure of 0.15 to 0.25 mpa, resulting a Brix.sup.°10 solution. Then the solution is pushed through a nano filtration system and a vacuum low-temperature scraper film evaporator to obtain a Brix.sup.°60 purple sweet potato extract that contains 0.52% of anthocyanin and 1.2% of phenolic compounds. A purified purple sweet potato powder can be obtained from centrifuged sediment and filtered residues and dried in vacuum.

Another example of producing PSP juice and powers using the process in the present invention is described. 15 Kg raw fresh purple sweet potatoes are soaked, washed and sterilized and at the same time de-activating the existing enzymes. Then they are ground and blended while its color is fixed by adjusting its pH value to 5.0. Next, 40 Kg water is added and the puree is liquefied. The liquid purple sweet potato juice is then warmed up to 90° C. to 110° C. for 5 minutes. Adjust its pH value to 5.0, add 10 SKBU/g of amylase solution, and maintain the temperature at 60° C. to 65° C. Let the solution rest for 2.5 hours. Then adjust the pH value to 4.0 to 4.5 and then add 22 U/g the enzyme complex of hemicellulase, pectinase, cellulose, glugoamylase, and protease. Maintain the temperature between 55° C.-65° C. Let it stand for 2.5 hours. The solution is then filtered by pressure filtration and centrifugation to remove the residues. The solution is further filtered with a microporous membrane with inlet pressure of 0.15 to 0.25 mpa, resulting in a Brix°8 solution. Then the solution is pushed through a nano filtration system and a vacuum low-temperature scraper film evaporator to obtain a Brix°56 purple sweet potato extract that contains 0.5% of anthocyanin and 1% of phenolic compounds. A purple sweet potato powder can be obtained from centrifuged sediment and filtered residue and dried in vacuum.

One more example of producing PSP juice and powers using the process in the present invention is described. 15 Kg dried purple sweet potatoes are soaked, washed and sterilized and at the same time de-activating the existing enzymes. Then they are ground and blended while its color is fixed by adjusting its pH value to 5.0.Next, 65 Kg water is added and the puree is liquefied. The liquid purple sweet potato juice is then warmed up to 90.degree. C. to 110.degree. C. for 5 minutes. Adjust its pH value to 5.0, add 8 SKBU/g of amylase solution, and maintain the temperature at 60.degree. C. to 65.degree. C. Let the solution rest for 3 hours. Then adjust the pH value to 4.0 to 4.5 and then add 33 U/g the enzyme complex of hemicellulase, pectinase, cellulase, glugoamylase, and protease Maintain the temperature between 60.degree. C. to 65.degree. C. Let it rest for 4.5 hours. The solution is then filtered by pressure filtration and centrifugation to remove the residues. The solution is further filtered with a microporous membrane with inlet pressure of 0.15 to 0.25 mpa, resulting a Brix.sup.°8 solution. Then the solution is pushed through a nano filtration system, reverse osmosis system and a vacuum low-temperature scraper film evaporator to obtain a Brix.sup.°55 purple sweet potato extract that contains 0.46% of anthocyanin and 0.8% of phenolic compounds. A purified purple sweet potato powder can be obtained from centrifuged sediment and filtered residue and dried in vacuum.

CITED REFERENCES

[Andres-Lacueva, 2005] Andres-Lacueva C, Shukitt-Hale B, Galli R L, Jauregui O, Lamuela-Raventos R M, Joseph J A. Anthocyanins in aged blueberry-fed rats are found centrally and may enhance memory. *Nutr Neurosci.* 2005 April; 8(2):111-20. PMID: 16053243.

[Cho, 2003] Cho J, Kang J S, Long P H, Jing J, Back Y, Chung K S. Antioxidant and memory enhancing effects of purple sweet potato anthocyanin and cordyceps mushroom extract. *Arch Pharm Res.* 2003 October; 26(10):821-5

[Kano, 2005] Kano M, Takayanagi T, Harada K, Makino K, Ishikawa F. Antioxidative activity of anthocyanins from purple sweet potato, Ipomoera batatas cultivar Ayamurasaki. *Biosci Biotechnol Biochem.* 2005 May; 69(5):979-88.

[Lau, 2005] Lau F C, Shukitt-Hale B, Joseph J A. The beneficial effects of fruit polyphenols on brain aging. *Neurobiol Aging.* 2005 December; 26 Suppl 1:128-32. Epub 2005 Sep. 27. Review. PubMed PMID: 16194581.

[Lee, 2005] Lee J, Lee H K, Kim C Y, Hong Y J, Choe C M, You T W, Seong G J. Purified high-dose anthocyanoside oligomer administration improves nocturnal vision and clinical symptoms in myopia subjects. *Br J Nutr.* 2005 June; 93(6):895-9.

[Miyazaki, 2008] Miyazaki K, Makino K, Iwadate E, Deguchi Y, Ishikawa F. Anthocyanins from purple sweet potato Ipomoea batatas cultivar Ayamurasaki suppress the development of atherosclerotic lesions and both enhancements of oxidative stress and soluble vascular cell adhesion molecule-1 in apolipoprotein E-deficient mice. *J Agric Food Chem.* 2008 Dec. 10; 56(23):11485-92.

[Nakaishi, 2000] Nakaishi H, Matsumoto H, Tominaga S, Hirayama M. Effects of black current anthocyanoside intake on dark adaptation and VDT work-induced transient refractive alteration in healthy humans. *Altern Med Rev.* 2000 December; 5(6):553-62.

[Park, 2010] Park K H, Kim J R, Lee J S, Lee H, Cho K H. Ethanol and water extract of purple sweet potato exhibits anti-atherosclerotic activity and inhibits protein glycation. *J Med Food.* 2010 February; 13(1):91-8.

[Pilaczynska-Szczesniak, 2005] Pilaczynska-Szczesniak L, Skarpanska-Steinborn A, Deskur E, Basta P, Horoszkiewicz-Hassan M. The influence of chokeberry juice supplementation on the reduction of oxidative stress resulting from an incremental rowing ergometer exercise. *Int J Sport Nutr Exerc Metab.* 2005 February; 15(1):48-58.

[Ramirea, 2005] Ramirez M R, Izquierdo I, do Carmo Bassols Raseira M, Zuanazzi J A, Barros D, Henriques A T. Effect of lyophilised Vaccinium berries on memory, anxiety and locomotion in adult rats. *Pharmacol Res.* 2005 December; 52(6):457-62. Epub 2005 Aug. 10.

[Shan, 2009] Shan Q, Lu J, Zheng Y, Li J, Zhou Z, Hu B, Zhang Z, Fan S, Mao Z, Wang Y J, Ma D. Purple sweet potato color ameliorates cognition deficits and attenuates oxidative damage and inflammation in aging mouse brain induced by d-galactose. *J Biomed Biotechnol.* 2009; 2009:564737. Epub 2009 Oct. 26.

[Shindo, 2007] Shindo M, Kasai T, Abe A, Kondo Y. Effects of dietary administration of plant-derived anthocyanin-rich colors to spontaneously hypertensive rats. *J Nutr Sci Vitaminol* (Tokyo). 2007 February; 53(1):90-3.

[Wang, 2009] Wang Y J, Zheng Y L, Lu J, Chen G Q, Wang X H, Feng J, Ruan J, Sun X, Li C X, Sun Q J. Purple sweet potato color suppresses lipopolysaccharide-induced acute inflammatory response in mouse brain. *Neurochem Int.* 2010 February; 56(3):424-30. Epub 2009 Nov. 24.

[Wang, 2005] Wang Y, Chang C F, Chou J, Chen H L, Deng X, Harvey B K, Cadet J L, Bickford P C. Dietary supplementation with blueberries, spinach, or spirulina reduces ischemic brain damage. *Exp Neurol.* 2005 May; 193(1):75-84.

[Wu, 2008] Wu D M, Lu J, Zheng Y L, Zhou Z, Shan Q, Ma D F. Purple sweet potato color repairs d-galactose-induced spatial learning and memory impairment by regulating the expression of synaptic proteins. *Neurobiol Learn Mem.* 2008 July; 90(1):19-27. Epub 2008 Mar. 7.

[Ye, 2009] Ye J, Meng X, Yan C, Wang C. Effect of purple sweet potato anthocyanins on beta-amyloid-mediated PC-12 cells death by inhibition of oxidative stress. *Neurochem Res.* 2010 March; 35(3):357-65. Epub 2009 Sep. 22.

What is claimed is:

1. A method for producing a purified purple sweet potato (PSP) concentrate, the method comprising the phases of:
   a preprocessing PSPs phase including washing and sterilizing PSPs;
   a liquefying PSPs phase including grinding and blending serialized PSPs and adding citric acid to fix the color of a PSP puree;
   an enzyme treatment phase including heating the liquefied PSP slurry, adjusting pH value of the PSP slurry using citric acid and amylase solution, after a cool down period again adjusting the pH value of the PSP slurry using citric acid and enzyme complex and heating the PSP slurry for enzyme deactivation, wherein the enzyme complex consists of 0.1% to 15% hemicellulase, 0.1% to 20% pectinase, 0.1% to 15% of cellulase, 35% to 95% of glucoamylase and 0.1% to 15% of protease, wherein the enzyme complex facilitates the extraction and concentration of anthocyanins and phenolics from the PSP;
   a filtration phase including press-filtering PSP suspension solution to separate supernatant from PSP sediment, purifying the supernatant solution by membrane filtration and nano-filtering purified supernatant to obtain a purified PSP juice; and
   a harvesting phase comprising low temperature vacuum concentrating the purified PSP juice to yield the PSP concentrate that is more than 55° Brix, with low viscosity and that contains more than 0.5% of anthocyanin and more than 1% of phenolic compounds.

2. The method of claim 1, wherein the preprocessing phase comprising the steps of:
   washing and soaking PSPs, including fresh purple sweet potatoes or dried purple sweet potatoes, with purified water; and
   sterilizing cleaned PSPs by steaming at 80° C. to 125° C. for 20 to 80 minutes, wherein the steaming also serves as a process to de-activate the enzymes in the PSPs.

3. The method of claim 1, wherein the liquefying phase comprising the steps of:
   grinding and blending sterilized PSPs to obtain a consistent puree;
   fixing the color of the PSP puree by adjusting the pH value of the PSP puree to 2.5 to 5.5 using citric acid; and
   liquefying the PSP puree by adding treated water.

4. The method of claim 3, wherein liquefying the purple sweet potato puree involves adding 0.5 to 3 times its weight of treated water for fresh raw purple sweet potato, and involves adding 2 to 8 times its weight of treated water for dried purple sweet potato.

5. The method of claim 1, wherein the enzyme treatment phase comprising the steps of:
   heating up liquefied PSP slurry to 90° C. to 110° C. for 1 to 6 minutes and waiting the slurry to cool down to the room temperature at 10° C. to 35° C.;
   adjusting pH value of the PSP slurry to 4.0 to 7.0 by using citric acid and adding 5 to 15 SKBU/g amylase solution to the slurry, wherein amylase is an enzyme that catalyzes the break down and convert the starch of the purple sweet potatoes into sugars;

maintaining the temperature of PSP slurry at 40° C.-65° C. for 1 to 3 hours before cooling down to the room temperature at 10° C. to 35° C.; and adjusting the pH value of PSP sediment to 3.0 to 5.0 by citric acid and adding 5-36 U/g of an enzyme complex consists of 0.1% to 15% hemicellulase, 0.1% to 20% pectinase, 0.1% to 15% of cellulase, 35% to 95% of glucoamylase and 0.1% to 15% of protease while maintaining the temperature between 40° C. to 70° C. for 1 to 5 hours to produce a lower viscosity PSP juice by removing the starch and with a better yield of the juice; and heating the PSP slurry to 80° C. to 90° C. for 1 to 10 minutes for the purpose of enzyme deactivation.

6. The method of claim 1, wherein the filtration phases comprising the steps of:

press-filtering or centrifuging the PSP suspension solution to separate supernatant from the PSP sediment;

purifying the supernatant solution by membrane filtration to obtain the PSP liquid with a Brix value of 6° to 12°; and nano-filtering purified supernatant to obtain the purified PSP juice.

7. The method of claim 1, wherein the harvesting phase further comprising:

vacuum concentrating and drying the PSP sediment and the PSP concentrate mixture to produce a PSP dried powder with more than 1% of anthocyanin.

* * * * *